May 19, 1931.  J. M. VAWTER  1,806,510
BRAKE
Filed May 5, 1928
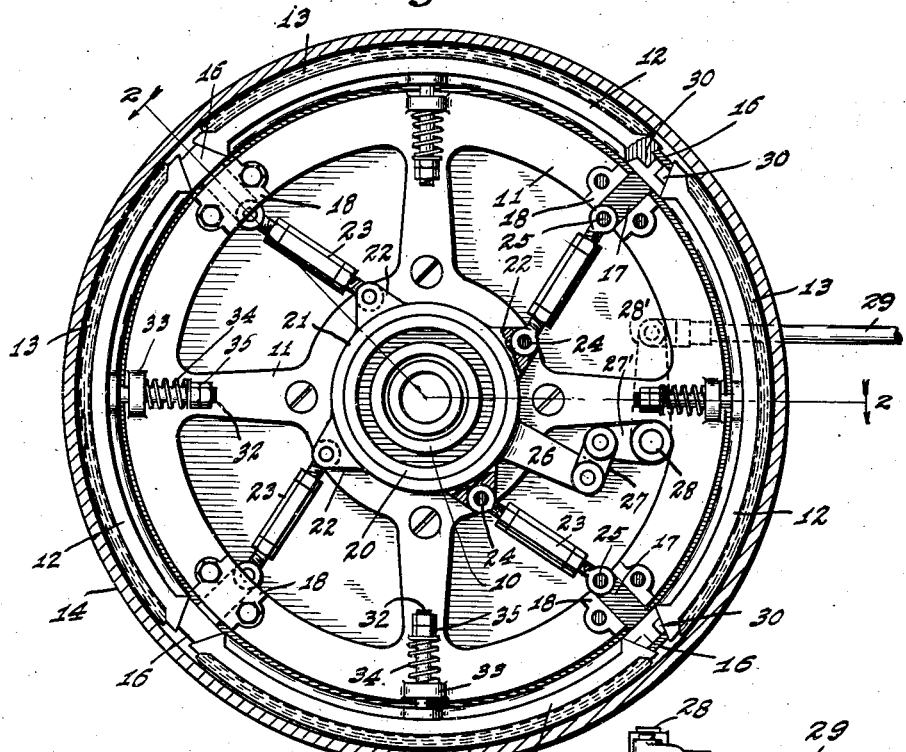
Fig. 1.
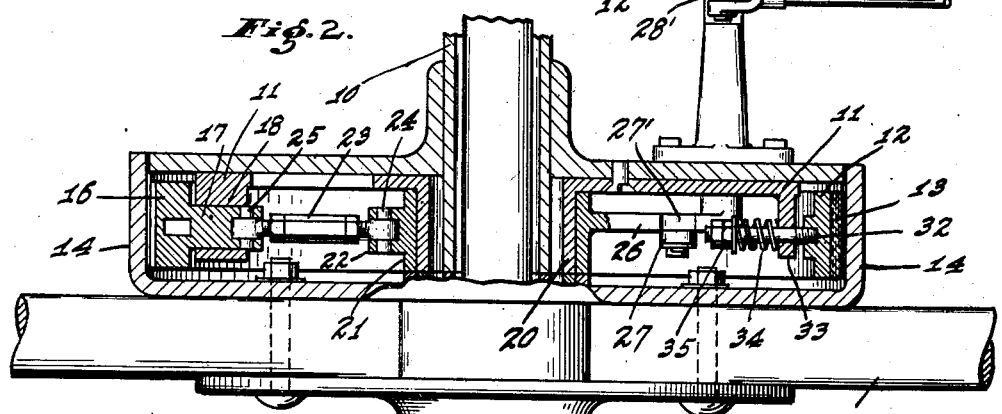
Fig. 2.
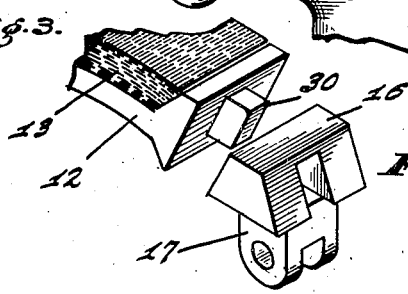
Fig. 3.
Fig. 4.
Inventor
JOHN M. VAWTER,
By Schloyfrash
Attorneys Patented May 19, 1931

1,806,510

UNITED STATES PATENT OFFICE

JOHN M. VAWTER, OF INDIANAPOLIS, INDIANA, ASSIGNOR TO SHADBERG COMPANY, OF INDIANAPOLIS, INDIANA, A CORPORATION OF INDIANA

BRAKE

Application filed May 5, 1928. Serial No. 275,286.

My invention is concerned with brakes or clutches, and particularly with brakes of the internal expanding type in which a plurality of brake shoes may be brought into engagement with the inner surface of a brake drum to produce the desired braking effect. It is my object to produce such a brake in which the brake shoes will extend substantially throughout the entire circumference of the brake drum in order to provide a maximum of braking surface. A further object of my invention is to provide such a brake in which each brake shoe at every point throughout its extent will be forced into engagement with the associated brake drum. Still another object of my invention is to produce a brake capable of exerting its braking effect gradually.

I accomplish the above objects by the provision of a plurality of segmental brake shoes between the ends of which are radially slidable brake-actuating members in the form of wedges having inclined working faces, and I provide the brake shoes with end faces of complementary inclination to the working faces of the brake-actuating members. I provide guiding means for each brake-actuating member, and control means capable of jointly moving the brake-actuating members inwardly or outwardly to cause release or setting of the brake.

The accompanying drawings illustrate my invention: Fig. 1 is an end. elevation of brake mechanism, with the brake drum shown in section; Fig. 2 is an axial section on the line 2—2 of Fig. 1; and Figs. 3 and 4 are fragmental perspective views illustrating the construction of the brake shoes and actuating members.

In the drawings my invention is illustrated as applied to the rear wheels of an automobile, although it is capable of use in other situations. When my invention is embodied in association with the rear wheels of an automobile, I may mount rigidly at each end of the axle housing 10 a stationary supporting member 11 which is conveniently in the form of a spider as shown in the drawings. This supporting member or spider 11 serves as a support for the moving parts of the brake.

The number of brake shoes which I employ may vary to meet the circumstances; but in the drawings, I have shown four brake shoes 12, each of which is arcuate in shape and slightly less than 90° in angular extent. The outer surface of each of the brake shoes is desirably covered with some suitable brake lining 13 adapted to be brought into engagement with the inner circumferential surface of the brake drum 14 carried by the wheel 15 mounted on the end of the axle housing.

Each of the brake shoes is desirably thickened radially at its ends, and the end faces of each shoe are oppositely inclined as is clear from Fig. 1.

Located between the ends of adjacent shoes I provide wedges 16 having inclined working faces complementary to the end faces of the shoes. Each of the wedges 16 is desirably provided with an integral shank 17 adapted to be received in a guide 18 mounted on the supporting member or spider 11. The shanks 17 of the shoes 16 are radially slidable in their respective guides 18 and may be moved outwardly to set the brake or inwardly to release it. The shanks 17 and the openings in the guides 18 in which such shanks are received are desirably non-circular in cross-section to prevent any rotation of the shanks in their guides.

Various means may be employed for effecting the radial sliding movement of the brake-actuating members or wedges 16. In the particular embodiment of my invention illustrated in the drawings, I provide on each of the spiders 11 an outwardly extending hub 20 on which is rotatably mounted a collar 21. At spaced points, this collar is provided with lugs 22 each of which is connected to one of the brake-actuating members 16. This connection is desirably effected by links 23 each of which is pivotally connected to its associated lug 22 by means of a pivot pin 24 and to the shank 17 of the associated brake-actuating member 16 by a second pivot pin 25. The axes of the various pins 24 and 25 are all substantially parallel to the axis of the hub 20 in order to permit rotation of the collar 21 on the hub. The links 23 are of such a length that the lug 22 associated with each link is angularly spaced from the brake-actuating member 16 to which the other end of such link is attached, as is clear from Fig. 1. As is illustrated in the drawings, each of the lugs 22 is spaced in a clockwise direction from the corresponding brake-actuating member 16, so that counter-clockwise rotation of the collar 21 on the hub 20 will cause the various brake-actuating members 16 to be moved outward.

As illustrated in the drawings, the links 23 are shown as turnbuckles in order to provide for adjustment of their effective length, but this is not necessary. The ends of the links 23 are conveniently provided with cylindrical end surfaces respectively concentric with the axes of the associated pivot pins 24 and 25, these end surfaces being arranged to engage correspondingly curved surfaces on the lugs 22 and shanks 17. This increases the effective bearing surface, reduces wear, and results in longer life and greater safety.

To provide for rotation of the collar 21 on the hub 20, I may provide it with an operating arm 26 the outer end of which is connected through a link 27 with an arm 27' rigidly mounted on a rock shaft 28 which extends through the supporting member 11; and which, on the opposite side of such supporting member, has mounted upon it a second arm 28' adapted to be connected through a rod 29 with any suitable form of brake-operating mechanism.

Desirably, each of the shoes 12 is connected to its associated wedge 16 in such a manner that retraction of the wedges will cause the shoes to move inwardly away from the surface of the associated brake drum 14. To this end, I may provide the end faces of the shoes 12 with lugs 30 adapted to enter recesses in the wedges 16, as is clear from Fig. 3 and Fig. 4. These lugs bear against the outer walls of the recesses in the shoes 16 and cause the shoes to be drawn inwardly whenever the wedges are retracted.

To provide an additional support for each of the shoes and to prevent any possibility of rattling, I mount near the center of each shoe a pin 32 which extends radially inward through a lug 33 carried on the supporting member or spider 11. A coil spring 34 acts between each of the lugs 33 and a suitable abutment, such as the nut 35, near the inner end of the associated pin 32, such springs tending to draw their associated shoes inwardly out of engagement with the brake drum 14.

With the parts in the position illustrated in Fig. 1, the brake is released and offers no opposition to free rotation of the wheel 15 and brake drum 14. When it is desired to apply the brake, the rod 29 is moved to the right, and the resultant rocking of the rock shaft 28 causes a counter-clockwise movement of the collar 21. Owing to the inclined position of the links 23, this counter-clockwise movement of the collar 21 causes each of the brake-actuating members 16 to be moved outward. The brake shoes 12 are carried outward with the wedges 16 and come into engagement with the inner surface of the brake drum 14 to create a frictional drag opposing rotation of the brake drum and its associated wheel. On increase in the force tending to rotate the collar 21 in the counter-clockwise direction, the wedges 16 are forced outward and apply to each brake shoe end thrust forces tending to bow the shoe outward, thus insuring an even distribution of pressure over the entire working face of each shoe. The size of the end thrust forces applied to the shoes by the wedges 16 will be dependent upon the inclination of their working surfaces. This inclination may be varied to suit the circumstances; but in general, I have found it advisable if an even distribution of pressure over the total extent of each brake shoe is to be maintained to incline these faces at some angle equal to or less than 45° to the radius through the associated wedge-shank 17.

In a brake such as has been described and illustrated, a relatively small force applied to the rod 29 will produce a large braking effort due to the mechanical advantage of the wedges 16 and also to the even distribution of pressure over the working surfaces of the brake shoes. My brake also has the advantage that it may be controlled with precision to apply the exact braking effort desired.

While my invention has been described as embodied in an automobile brake, it is not limited to this use; as it can be successfully employed in any situation where it is desired to provide a frictional interconnection between relatively rotatable parts.

I claim as my invention:—

1. A brake, comprising in combination with a brake drum, a stationary member, a plurality of segmental brake shoes located inside of said brake drum and having inclined end faces, brake-actuating members, guiding means carried by said stationary member for supporting said brake-actuating members for radial sliding movement, each of said brake-actuating members having oppositely inclined working faces arranged to engage respectively the inclined end faces of two adjacent brake shoes, each of said brake shoes being provided at each end with lugs, said brake-actuating members being provided with recesses for the reception of said lugs, a collar rotatably supported on said stationary member within said brake drum, inclined links respectively connecting said brake-actuating members with said collar, and means for rotating said collar to produce inward or outward movement of said brake-actuating members.

2. A brake, comprising in combination with a brake drum, a stationary member, a plurality of segmental brake shoes located inside of said brake drum and having inclined end faces, brake-actuating members, guiding means carried by said stationary member for supporting said brake-actuating members for sliding movement, each of said brake-actuating members having oppositely inclined working faces arranged to engage respectively the inclined end faces of two adjacent brake shoes, a collar rotatably supported on said stationary member within said brake drum, inclined links respectively connecting said brake-actuating members with said collar, and means for rotating said collar to produce inward or outward movement of said brake-actuating members.

3. A brake, comprising in combination with a brake drum, a stationary member, a plurality of segmental brake shoes located inside of said brake drum and having inclined end faces, brake-actuating members, guiding means carried by said stationary member for supporting said brake-actuating members for radial sliding movement, each of said brake-actuating members having oppositely inclined working faces arranged to engage respectively the inclined end faces of two adjacent brake shoes, each of said brake shoes being provided at each end with lugs, said brake-actuating members being provided with recesses for the reception of said lugs, and means for moving said brake-actuating members inwardly or outwardly to produce release or setting of the brake.

4. A brake, comprising in combination with a brake drum, a stationary member, a plurality of segmental brake shoes located inside of said brake drum and having inclined end faces, brake-actuating members, guiding means carried by said stationary member for supporting said brake-actuating members for sliding movement, each of said brake-actuating members having oppositely inclined working faces arranged to engage respectively the inclined end faces of two adjacent brake shoes, and means for moving said brake-actuating members inwardly or outwardly to produce release or setting of the brake.

5. A brake, comprising in combination with a brake drum, a stationary member, a plurality of segmental brake shoes having inclined end faces, brake-actuating members, guiding means carried by said stationary member for supporting said brake-actuating members for sliding movement, each of said brake-actuating members having oppositely inclined working faces arranged to engage respectively the inclined end faces of two adjacent brake shoes, and means for moving said brake-actuating members inwardly or outwardly to produce release or setting of the brake.

6. The invention set forth in claim 5 with the addition of means for supporting each of said brake shoes at a point intermediate its ends.

7. In combination, two relatively rotatable members, a drum carried by one of said members, segmental shoes carried by the other of said members and movable into and out of engagement with said drum, said shoes having inclined end faces, actuating members located between the ends of adjacent shoes, guiding means for said actuating members, said actuating members having inclined working faces and arranged to engage the inclined end faces of said shoes, and means for moving said brake-actuating members in one direction to cause said shoes to engage said drum and in the other direction to release said shoes from engagement with the drum.

8. A brake, comprising in combination with a brake drum, a stationary member, a plurality of segmental brake shoes located inside of said drum and having inclined end faces, brake actuating members, guiding means carried by said stationary member for supporting said brake-actuating members for sliding movement, each of said brake-actuating members being arranged to engage the inclined end faces of two adjacent brake shoes, and means for moving said brake-actuating members inwardly or outwardly to cause release or setting of said brake.

9. A brake, comprising in combination with a brake drum, a stationary member, a plurality of segmental brake shoes located inside of said drum, brake actuating members, guiding means carried by said stationary member for supporting said brake-actuating members for sliding movement, each of said brake-actuating members having oppositely inclined working faces arranged to engage the end faces of two adjacent brake shoes, and means for moving said brake-actuating members inwardly or outwardly to cause release or setting of said brake.

10. In combination, two relatively rotatable members, a drum carried by one of said members, segmental shoes carried by the other of said members and movable into and out of engagement with said drum, actuating members located between the ends of adjacent shoes, guiding means for said actuating members, said actuating members having inclined working faces and arranged to engage the end faces of said shoes, and means for moving said brake-actuating members in one direction to cause said shoes to engage said drum and in the other direction to release said shoes from engagement with the drum.

11. In combination, two relatively rotatable members, a drum carried by one of said members, segmental shoes carried by the other of said members and movable into and out of engagement with said drum, said shoes having inclined end faces, actuating members located between the ends of adjacent shoes, guiding means for said actuating members, said actuating members being arranged to engage the inclined end faces of said shoes, and means for moving said brake-actuating members in one direction to cause said shoes to engage said drum and in the other direction to release said shoes from engagement with the drum.

12. In combination, two relatively rotatable members, a drum carried by one of said members, segmental shoes carried by the other of said members, actuating members mounted for inward and outward movement, each of said actuating members being located between the ends of two adjacent shoes, each of said actuating members and its associated shoes having mating faces inclined at an angle not greater than 45° to the line of movement of the actuating member, and means for moving said actuating members inwardly or outwardly.

13. In combination, two relatively rotatable members, a drum carried by one of said members, segmental shoes carried by the other of said members, actuating members mounted for inward and outward movement, each of said actuating members being located between the ends of two adjacent shoes, each of said actuating members having faces adapted to engage the adjacent shoes, said faces being oppositely inclined at an angle not greater than 45° to the line of movement of the actuating member, and means for moving said actuating members inwardly or outwardly.

14. In combination, two relatively rotatable members, a drum carried by one of said members, segmental shoes carried by the other of said members, actuating members mounted for inward and outward movement, each of said actuating members being located between the ends of two adjacent shoes, said shoes having end faces arranged to be engaged by said actuating members, each of said end faces being inclined at an angle not greater than 45° to the line of movement of the co-operating actuating member, and means for moving said actuating members inwardly or outwardly.

15. The invention set forth in claim 1 with the addition that said links have cylindrical end faces, said collar and said actuating members being provided with corresponding mating surfaces to take thrust forces transmitted through said links.

16. The invention set forth in claim 7 with the additions that said actuating members have non-circular shanks and that said guiding means have non-circular openings for the reception of said shanks.

In witness whereof, I have hereunto set my hand at Indianapolis, Indiana, this 18th day of April, A. D. one thousand nine hundred and twenty eight.

JOHN M. VAWTER.